Feb. 20, 1923.

H. G. IRWIN

VEHICLE WHEEL REPAIR WASHER

Filed Feb. 24, 1922

1,446,422

INVENTOR

Patented Feb. 20, 1923.

1,446,422

UNITED STATES PATENT OFFICE.

HERBERT G. IRWIN, OF AMARILLO, TEXAS.

VEHICLE WHEEL REPAIR WASHER.

Application filed February 24, 1922. Serial No. 538,851.

*To all whom it may concern:*

Be it known that I, HERBERT G. IRWIN, a citizen of the United States, residing at Amarillo, in the county of Potter and State of Texas, have invented a new and useful Vehicle Wheel Repair Washer, of which the following is a specification.

My invention relates to improvements in vehicle wheel repair attachments in which washers and the like are inserted between the shoulder of the spoke and the felloe of the wheel to tighten the spokes therein; and the objects of my improvement are, first, to provide two complemental washer sections that may be inserted between the shoulder of a spoke and felloe without dismantling the wheel; second, to provide cooperative washer units that will cover approximately all of the shoulder of a spoke adapted to engage the felloe of the wheel; and, third, to angle the inner marginal edges of the washer units for engaging the tenon of the spoke and the felloe of the wheel to hold the units in place.

These several stated objects and such other objects as will incidentally appear in the course of the following description are attained in such an attachment as is illustrated in the accompanying drawings, and the invention resides in certain novel features which will be pointed out in the claims following the description.

In the accompanying drawings:—

Figure 3:
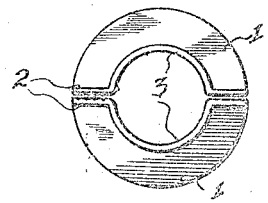
Figure 3 illustrates the method of forming a washer by placing two units or sections together.
Figure 1:
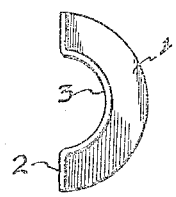
Figure 1 is a plan view of a washer section or unit.

The showing of a section of a wheel in the drawings is intended for illustrative purposes only, as it is to be understood that in the practical application of my washer attachment the same may be used to repair any wooden vehicle wheel having spokes, since the washer units may be made in different sizes for different size wheels and may easily be cooperatively attached around the tenon of the spokes between their shoulders and the felloe or rim of the wheel for taking up the looseness which frequently occurs in wooden wheels by any one familiar with vehicle wheel repairing.

Referring to the details of the drawing, 1 designates a bow shaped washer unit or half washer formed of suitable material having angled ends 2, which are adapted to penetrate the felloe 4, of the wheel for holding the unit in place.

Figure 5:
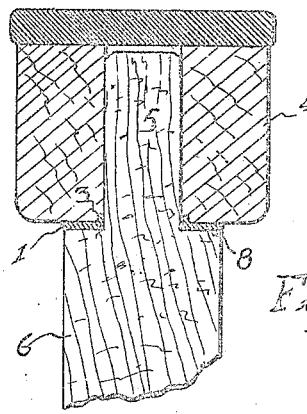
Figure 5 is a cross section of the rim of the wheel somewhat enlarged, on line 5 5, Fig. 6.
Figure 4:
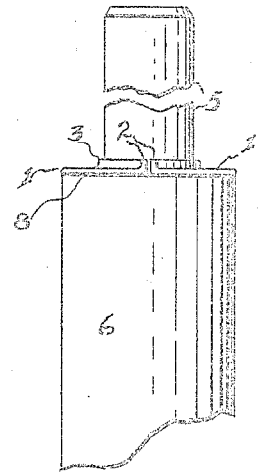
Figure 4 is an enlarged view of a wheel spoke illustrating the method of placing two washer units on the shoulder thereof.
Figure 6:
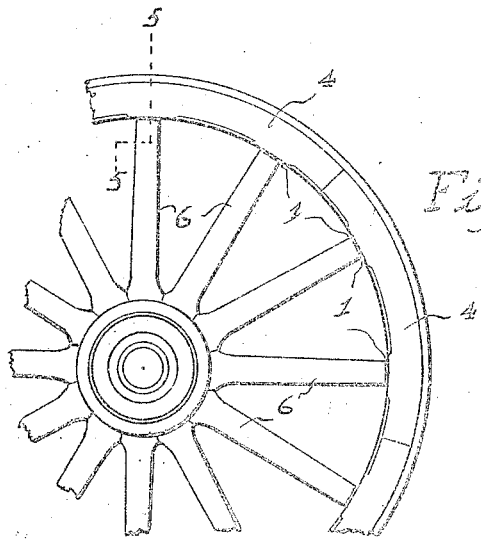
Figure 6 is a section of a vehicle wheel illustrating some washers attached.
Figure 2:
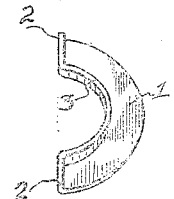
Figure 2 is a view in perspective of a washer unit.

The inner marginal edge 3 of the washer unit is also angled and is adapted to fit adjacent the tenon 5, of the spoke 6, with the body of the unit lying adjacent the shoulder 8, of the spoke as shown in Figures 4, 5 and 6, for holding the units in place and tending to wedge the tenon in the felloe.

In attaching the washer, suitable means may be employed to spring the felloe off the shoulder 8 of the spoke and two washer units inserted, one on each side of the tenon 5 with the angled ends 2 adjacent each other, (see Fig. 4) then the felloe may be released allowing same to come back against the units, the angled end portions thereof penetrating the felloe thereby holding the units in place. In this manner they may be applied to all of the spokes in a wheel with obvious results.

I am aware that prior to my invention vehicle wheels have been repaired with washers inserted between the shoulder of the spoke and the felloe of the wheel. I therefore do not claim such a device broadly; but—

I claim:

1. A vehicle wheel repair washer, comprising two complemental sections having a continuous inner angled edge adapted to hold the sections together between the shoulder of the spoke and the felloe.

2. A vehicle wheel repair device, comprising two half washer units having continuous inner angled edge portions adapted to retain the ends of said units adjacent each other to form a ring around the tenon of the spoke between the shoulder thereof and the felloe of the wheel.

3. A vehicle wheel repair attachment adapted to encircle the tenon of a spoke, comprising two complemental washer sections, each having a continuous inner angled edge.

4. A vehicle repair washer adapted to be placed around the tenon of the spoke, comprising two flat half ring sections each having a continuous inner broadened edge for holding the sections in place.

5. A vehicle wheel repair washer adapted to be placed about the tenon of the spoke, comprising two half washer units each having its entire inner edge drawn above one face thereof to form an incisive edge adapted to cut into the wood of the wheel for holding the units in place.

HERBERT G. IRWIN.